Patented Apr. 2, 1940

2,196,015

UNITED STATES PATENT OFFICE 2,196,015

AZO DYESTUFFS INSOLUBLE IN WATER AND FIBER DYED THEREWITH

Hans Heyna, Willy Schumacher, and Otto Scherer, Frankfort-on-the-Main, Germany, assignors to General Aniline & Film Corporation, a corporation of Delaware No Drawing. Application October 15, 1938, Serial No. 235,262. In Germany October 19, 1937

8 Claims. (Cl. 260—204)

The present invention relates to azo-dyestuffs insoluble in water and to fibers dyed therewith; more particularly, it relates to dyestuffs of the following general formula:

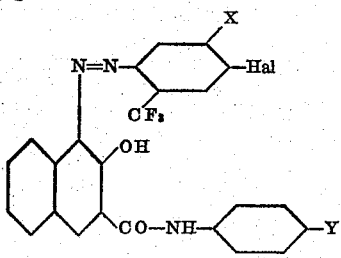

wherein X stands for hydrogen or halogen, and Y for hydrogen or chlorine.

We have found that valuable azo-dyestuffs insoluble in water are obtainable by coupling in substance, on the fiber, or on a substratum adapted for the production of lakes, a diazonium-compound from an amine of the following constitution

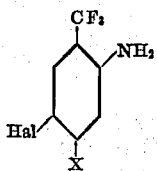

wherein X represents hydrogen or a halogen, with a 2.3-hydroxynaphthoic acid arylide of the general formula

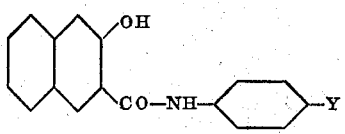

wherein Y represents hydrogen or chlorine. The dyestuffs thus obtained have vivid scarlet and red tints of very good fastness properties. Clear tints of this kind, having very good fastness to light and to washing, have not hitherto been produced with aid of these important naphthols. The dyestuffs, therefore, are a valuable addition to the number of scarlet and red azo-dyestuffs insoluble in water, which have hitherto been used on a technical scale in dyeing and textile printing.

The amines used as diazo-components in this process may be prepared by the process described in British patent specification No. 452,436.

The following examples serve to illustrate the invention, but they are not intended to limit it thereto:

(1) *Grounding liquor:*
120 grams of 1-(2'.3'-hydroxynaphthoylamino)-benzene are dissolved at boiling temperature with
200 cc. of Turkey red oil of 50 per cent strength and
200 cc. of caustic soda solution of 38° Bé. The whole is then cooled to about 50° C. and
120 cc. of a formaldehyde solution of 30 per cent strength are added. After half-an-hour the whole is made up to 20 liters.

*Developing solution:*
40 grams of 1-amino-4-chloro-2-trifluoromethyl-benzene are diazotized in the usual manner, the diazo-solution is neutralized by means of sodium acetate solution and then made up to 20 liters. To this bath there is added 1 kilo of sodium chloride.

*Dyeing process:*
1 kilo of cotton or a mixed fabric consisting of cotton and staple fiber from viscose or cuprammonium cellulose is treated at 30° C. for half-an-hour in the grounding solution. The material is then well centrifuged and dyed for half-an-hour in the developing solution; it is then well rinsed, soaped at boiling temperature, rinsed again and dried.

A bright scarlet tint of very good fastness to light is obtained. The dyestuff corresponds with the following formula:

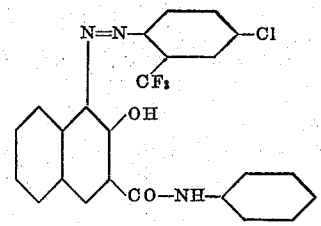

(2) By substituting in Example 1 60 grams of 1-(2'.3'-hydroxynaphthoylamino)-4-chlorobenzene for the 120 grams of 1-(2'.3'-hydroxynaphthoylamino)-benzene and 60 cc. of formaldehyde solution of 30 per cent strength for the 120 cc. of formaldehyde solution, a bluish red shade of very good fastness to light is obtained.

(3) By using in Example 1 a developing solution containing per 20 liters of cold water 72 grams of the diazonium-borofluoride from 1-amino-4.5-dichloro-2-trifluoromethylbenzene,
20 cc. of glacial acetic acid and
1 kilo of sodium chloride, a scarlet dyeing of very good fastness to light is obtained.

(4) By using in Example 2 instead of 1-amino-4-chloro-2-trifluoromethylbenzene the developing solution indicated in Example 3, a yellowish red of very good fastness to light is obtained.

(5) 1 kilo of wool bleached by means of hydrogen peroxide and sodium pyrophosphate is treated for ¾ hour at 55° C. in the following grounding liquor, then centrifuged, dyed for half-an-hour in the developing bath, rinsed, after-treated for 20 minutes with 1 gram of oleylmethyltaurine per liter of water at 80° C., rinsed again and dried.

*Grounding liquor:*
45 grams of 1-(2'.3'-hydroxynaphthoylamino)-benzene are dissolved in
90 cc. of alcohol,
22.5 cc. of a formaldehyde solution of 30 per cent strength,
22.5 cc. of caustic soda solution of 34° Bé. and
45 cc. of water. The solution is introduced into a bath containing per
30 liters of water of 55° C.
60 cc. of oleylmethyltaurine,
90 grams of calcined sodium carbonate and
600 grams of sodium chloride.

*Developing solution:*
30 grams of 1-amino-4-chloro-2-trifluoromethylbenzene are diazotized in the usual manner, the diazo-solution is neutralized by means of sodium acetate solution and made up to
30 liters.

A scarlet dyeing of very good fastness to light is obtained.

(6) A cotton fabric is padded with a solution containing 13.2 grams of 1-(2'.3'-hydroxynaphthoylamino)-benzene,
20 grams of Turkey red oil and
20 cc. of caustic soda solution of 32.5 per cent strength, and made up to 1 liter.

The fabric is then dried and printed with a printing paste prepared by dissolving the solid diazonium-compound from 9.8 grams of 1-amino-4-chloro-2-trifluoromethylbenzene in
10 cc. of acetic acid of 50 per cent strength and
400 cc. of water, thickening with
400 grams of starch tragacanth thickening and making up to
1 liter.

After printing, the fabric is dried, treated with hot sodium carbonate solution (10 grams per liter), rinsed while cold, soaped at boiling temperature, rinsed again, dried and finished.

A print having a vivid scarlet-red tint is obtained.

(7) 23 grams of 1-amino-4.5-dichloro-2-trifluoromethylbenzene are diazotized in the usual manner. Furthermore, 32 grams of 1-(2'.3'-hydroxynaphthoylamino)-4-chlorobenzene are dissolved in dilute caustic soda solution and reprecipitated by means of acetic acid. The diazo-solution is coupled with this precipitate containing the quantity of sodium acetate necessary for binding the mineral acid. When the formation of the dyestuff is finished the whole is filtered with suction, the solid matter is well washed and dried. The dyestuff is a light red powder which dissolves in concentrated sulfuric acid to a violet-red solution. The dyestuff may also be produced in the presence of a substratum adapted for the production of color lakes.

(8) 70 grams of the disodium salt of the diazoamino-compound from diazotized 1-amino-4.5-dichloro-2-trifluoromethylbenzene with 1-ethylamino-2-carboxybenzene-4-sulfonic acid in the form of a powder of 76.4 per cent strength and 30 grams of 1-(2'.3'-hydroxynaphthoylamino)-4-chlorobenzene are made into a paste with 50 grams of caustic soda solution of 38° Bé., 40 grams of Monopol brilliant oil and 75 cc. of water, dissolved by pouring thereon 230 cc. of hot water and made up to 1 kilo of printing color with 500 grams of tragacanth thickening 60:1000.

De-sized and bleached cotton fabric is printed with this paste, dried and steamed in the presence of vapors of acetic acid and formic acid for 5 minutes in a rapid ager. It is then rinsed and soaped at boiling temperature. A yellowish-red print of very good fastness to light is obtained.

(9) 28.1 grams of sodium 4-chloro-2-trifluoromethylbenzene-1-nitrosamine and 30 grams of 1-(2'.3'-hydroxynaphthoylamino)-benzene are made into a paste with 30 grams of caustic soda solution of 34° Bé., 25 grams of Monopol brilliant oil and 50 cc. of water, dissolved by pouring thereon 340 cc. of hot water and made up to 1 kilo of printing color with 500 grams of tragacanth thickening 60:1000.

After drying, the printed fabric is steamed in the moist state for 3 minutes or exposed to the air overnight, subsequently passed at 80° C. to 90° C. through a bath containing per liter 20 cc. acetic acid of 50 per cent strength, then rinsed and soaped at boiling temperature. A scarlet-red print of very good fastness to light is obtained.

We claim:
1. The water-insoluble azo-dyestuffs of the following general formula:

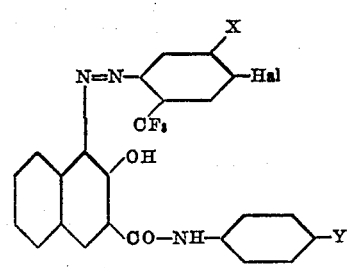

wherein X stands for a member of the group consisting of hydrogen and halogen, and Y for a member of the group consisting of hydrogen and chlorine, yielding, when produced on the fiber, vivid scarlet and red dyeings of very good fastness properties, particularly of very good fastness to light and to washing.

2. The water-insoluble azo-dyestuff of the following formula:

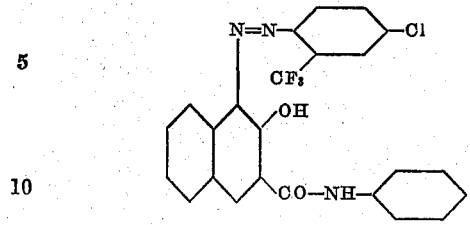

yielding, when produced on the fiber, a bright scarlet dyeing of very good fastness properties, particularly of very good fastness to light.

3. The water-insoluble azo-dyestuff of the following formula:

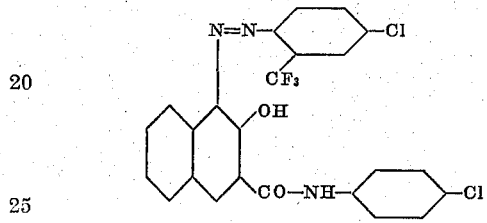

yielding, when produced on the fiber, a bluish-red dyeing of very good fastness properties, particularly of very good fastness to light.

4. The water-insoluble azo-dyestuff of the following formula:

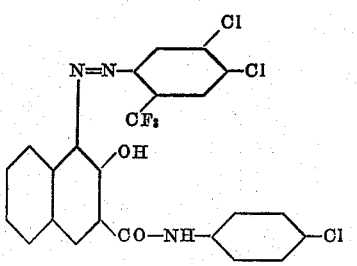

yielding, when produced on the fiber, a yellowish-red dyeing of very good fastness properties, particularly of very good fastness to light.

5. Fiber dyed with the water-insoluble azo-dyestuffs as claimed in claim 1.
6. Fiber dyed with the water-insoluble azo-dyestuff as claimed in claim 2.
7. Fiber dyed with the water-insoluble azo-dyestuff as claimed in claim 3.
8. Fiber dyed with the water-insoluble azo-dyestuff as claimed in claim 4.

HANS HEYNA.
WILLY SCHUMACHER.
OTTO SCHERER.